Patented Aug. 19, 1952

2,607,769

UNITED STATES PATENT OFFICE 2,607,769

DIPHENYL DISAZO DYES CONTAINING DEAMINATED AMINE COUPLING COMPONENTS

William H. Armento, Albany, N. Y., assignor to General Aniline & Film Corporation, New York, N. Y., a corporation of Delaware No Drawing. Application October 7, 1948, Serial No. 53,373

6 Claims. (Cl. 260—161)

This invention relates to a new class of azo dyes and particularly to disazo dyes having a tetrazotized diphenyl nucleus.

Azo dyes are derived by coupling diazo compounds with compounds designated as coupling components. These latter, in order to perform the coupling function, must contain activating groups which promote coupling. Generally such compounds are phenols, naphthols, aromatic amines and compounds which possess enolizable ketone groups of an aliphatic character. In the case of the phenols, naphthols and aromatic amines the activating phenolic or amino group directs coupling or attachment of the azo group to an ortho or para position depending upon the position of the phenolic or amino group itself and the character and position of other substituent groups in the molecule.

The phenolic and amino activating groups in the phenols, naphthols and aromatic amines also affect the dye properties of the azo dye produced from the coupling reaction. The amino group favors the production of a bathochromic effect, that is a shift from the yellow toward violet or a deepening effect. The corresponding hydroxy or phenolic compounds are more hypsochromic in effect. Hence, it may generally be said, that where deep colors are desired aromatic amines should be selected as the coupling components, and phenols or naphthols where lighter colors are desired. Additional substituents such as halogen, nitro, alkyl, aryl, alkoxy and additional amino and hydroxy groups having bathochromic effects are introduced in order to further modify the color.

The groups added for bathochromic purposes, however, may adversely affect other dyeing properties. Consequently, where an aromatic amine coupler may produce too deep a shade or may be undesirable for other reasons, a phenol or naphthol which has been modified by the introduction of bathochromic groups may lessen the substantivity of the resulting azo dye for certain materials or adversely affect its solubility properties.

It has now been discovered that a new class of azo dyes can be prepared by using an aromatic amine containing no auxochrome group other than the activating amine group as one of the coupling components of an unsymmetrical polyazo dye and deaminating the aromatic amine coupler. The preferred class of these dyes which have been found to possess improved properties as compared with the undeaminated dyes are derived from tetrazotized biphenyl compounds as the central nucleus having as one end component the radical of a coupling component containing auxochrome groups and as the other the radical of deaminated amino coupler. These dyes may be represented by the formula:

wherein R is the radical of a coupling component containing auxochrome groups such as pyrazolones, for example, phenyl methyl pyrazolone, and radicals of the benzene and naphthalene series containing auxochrome groups such as are derived from salicylic acid, phenol, $\alpha$- and $\beta$-naphthol, naphtholsulfonic acid, resorcin and cresidine; R' is a member of the group consisting of phenyl and naphthyl radicals; Y is a member of the group consisting of hydrogen, alkyl and sulfonic acid; $n$ is a positive whole number not greater than 3 and X is a member of the group consisting of hydrogen, methyl, methoxy and sulfonic acid groups. Coupling components from which the R'Y end component may be derived by deamination may be represented by the formula $(NH_2)_{n'}R'Y_n$, wherein $n'$ is a positive whole number not greater than 2 and R'Y and $n$ have the same values as above, such as 1-aminonaphthalene-(5, -6, or -7)-sulfonic acid, 1-aminonaphthalene-3,6-disulfonic acid, m-toluidine and phenylene diamine.

These deaminated dyes have excellent substantivity for leather, dyeing level and penetrating more deeply than the corresponding undeaminated dyes. They have excellent alkali solubilities. Some of these dyes are also excellent textile dyes, particularly on union materials such as cotton-wool, cotton-rayon, wool-rayon, mercerized cotton and rayon tubing. They have good acid resistant properties and good light and wash fastness.

In order to deaminate the intermediate dye containing the aromatic amine coupler, the amino group of said coupler is diazotized and the diazonium salt reduced by reaction with sodium formate or sodium acetate. The diazo compound of the dye readily reacts with the formate or acetate and the diazo group becomes reduced or replaced by hydrogen. In the case of the acetate reduction there may be side reactions resulting in some methylation, formation of biaryls and other products, but the formate results almost exclusively in the hydrogen replacement. Hence, although the acetate reduction works well in some instances, the formate process is generally preferred.

In carrying out the reduction process with formate or acetate an aqueous solution of the diazonium salt or the diazotization solution may be employed. Sufficient formate or acetate is added to neutralize all the free mineral acid in the solution and the acid formed during deamination. The reaction will take place at low temperature, but optimum results are obtained by raising the temperature to 60 to 70° C. and maintaining it at that level for one hour. Higher temperatures and shorter reaction times may be employed if desired.

The following examples will serve to further illustrate the invention, it being understood that the conditions, materials and quantities are not intended to be critical or to place any limitation on the scope of the invention.

*Example 1*

184 parts of benzidine are tetrazotized in the usual manner. To the neutralized tetrazo are added 145 parts of salicylic acid in slightly alkaline solution. 220 parts soda ash are then added and the mixture stirred at 5° to 10° C. until the monazo coupling is complete. A solution of 230 parts 1-aminonaphthalene-6-sulfonic acid is then added and the combination stirred over night. The following morning, 620 parts hydrochloric acid are added and the disazo combination diazotized with 75 parts sodium nitrite at 15° to 20° C. for two hours. 250 parts sodium acetate crystals are added and the mixture heated to 60° C. for one hour. The product is isolated by filtration and when dried yields a dark brown powder soluble in alkali to a clear yellow-brown solution. Probable formula is:

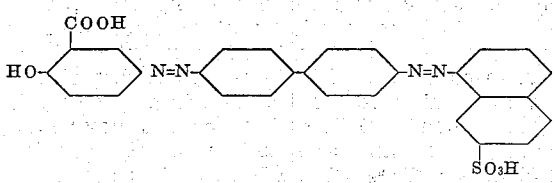

*Example 2*

Benzidine is tetrazotized and coupled to salicylic acid as in Example 1. A solution of 230 parts 1-aminonaphthalene-7-sulfonic acid is then added and the combination stirred over night. The following morning 620 parts hydrochloric acid are added and the disazo combination diazotized with 75 parts sodium nitrite at 15° to 20° C. for two hours. 125 parts sodium formate are added and the mixture heated to 70° C. for one hour. The product is isolated by filtration and when dried yields a dark violet powder soluble in alkali to a clear yellow brown solution. Probable formula is:

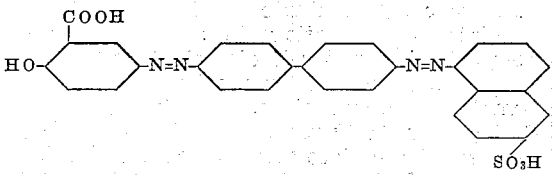

*Example 3*

184 parts benzidine are tetrazotized in the usual manner. To the neutralized tetrazo are added an alkaline solution of 185 parts 1-phenyl-3-methyl-5-pyrazolone, 220 parts soda ash are then added and the mixture stirred at 5° to 10° C. until the monoazo coupling is complete. A solution of 230 parts 1-aminonaphthalene-6-sulfonic acid is then added and the combination stirred over night. The following morning, 620 parts hydrochloric acid are added and the disazo combination diazotized with 75 parts sodium nitrite at 15° to 20° C. for two hours. 250 parts sodium acetate are added and the mixture heated to 60° C. for one hour. The product is isolated by filtration and when dry yields a dark brown powder soluble in alkali to a clear yellow-brown solution, of the probable formula:

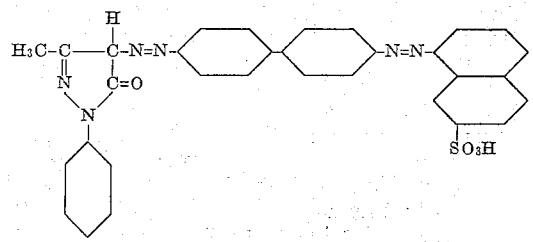

*Example 4*

244 parts of dianisidine are tetrazotized in the usual manner. After neutralization of the mineral acidity of the tetrazo 145 parts salicylic acid in a slightly alkaline solution are added. Temperature is adjusted to 5°–10° C. and a solution containing 200 parts soda ash is added over 1 hour. After stirring until the monoazo coupling is complete, a solution of 240 parts 1-naphthylamine-6-sulfonic acid is added. 10 parts caustic soda are added and the combination stirred over night. The following morning the combination is rediazotized as described in Example 2. 125 parts sodium formate are added and the rediazo heated to 70° C. for 1 hour. After filtration and drying, a dark brown powder is obtained which is readily soluble in alkali to a clear brown solution and has the probable formula:

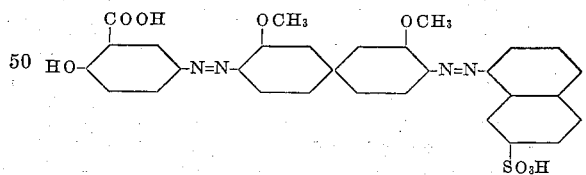

In the following table there are listed a number of other combinations of components which can be deaminated in a manner similar to the procedures of the foregoing examples.

*Deaminated colors*

| | Coupling Component | Tetrazo Component | 2nd Coupling Component | Shade after Deamination |
|---|---|---|---|---|
| 1 | Salicylic | Benzidine | 1-aminonaphthalene-5-sulfonic acid | Brown. |
| 2 | 2-hydroxy naphthalene-6,8-disulfonic acid | do | 1-aminonaphthalene-7-sulfonic acid | Red. |
| 3 | 2-hydroxy naphthalene-3,6-disulfonic acid | do | 1-aminonaphthalene-6-sulfonic acid | Red (bluer than Ex. 2). |
| 4 | 1-naphthol-5-sulfonic acid | do | do | Do. |
| 5 | 1-naphthol-3,6-disulfonic acid | do | do | Red Brown. |
| 6 | Phenol | do | do | Brown. |
| 7 | Resorcinol | do | do | Do. |
| 8 | Salicylic acid | o-tolidine | do | Do. |
| 9 | do | dianisidine | 1-aminonaphthalene-3,6-disulfonic acid | Do. |

I claim:
1. Disazo dyes containing a tetrazotized biphenyl radical and at least one radical of a coupling component having no activating group promoting coupling, said dyes being substantive to leather and being characterized by the structural formula:

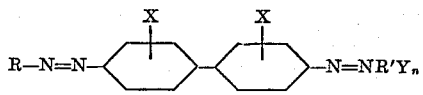

wherein R is a radical of a coupling component containing a non-primary-amino auxochrome group; R' is a member of the group consisting of phenyl and naphthyl radicals; Y is a member of the group consisting of H, alkyl and sulfonic acid; $n$ is a positive whole number not greater than 3; and X is a member of the group consisting of H, methyl, methoxy, and sulfonic acid groups.

2. The disazo dye having the formula:

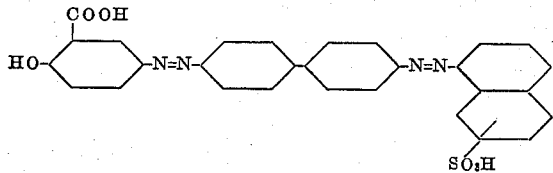

which is characterized by its substantivity to leather and is soluble in alkali to a yellow-brown solution.

3. The disazo dye having the formula:

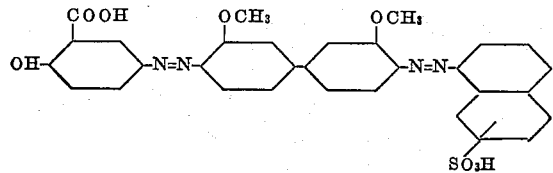

which is characterized by its substantivity to leather and is soluble in alkali to a clear brown solution.

4. The disazo dye having the formula:

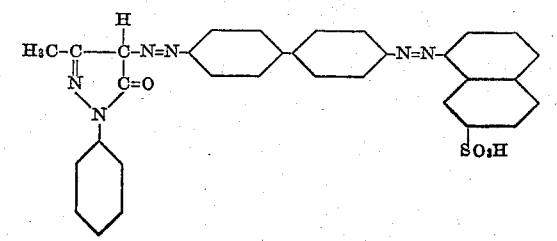

which is characterized by its substantivity to leather and is soluble in alkali to a clear yellow-brown solution.

5. The disazo dye having the formula:

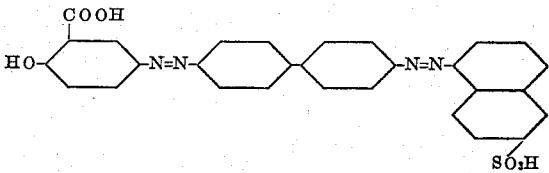

which is characterized by its substantivity to leather and is soluble in alkali to a clear yellow-brown solution.

6. The process of producing disazo dyes, which comprises deaminating the product having the formula:

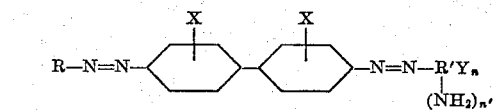

wherein R is a radical of a coupling component containing a non-primary-amino auxochrome group, R' is a member of the group consisting of phenyl and naphthyl radicals, Y is a member of the group consisting of hydrogen, alkyl and $SO_3H$, $n$ is a positive whole number not greater than 3, and $n'$ is a positive whole number not greater than 2, by diazotizing and reacting the said product with a member of the group consisting of alkali metal formate and alkali metal acetate.

WILLIAM H. ARMENTO.

REFERENCES CITED

The following references are of record in the file of this patent:

UNITED STATES PATENTS

| Number | Name | Date |
|---|---|---|
| 399,581 | Strasburger | Mar. 12, 1889 |
| 447,303 | Duisberg | Mar. 3, 1891 |
| 515,381 | Ulrich et al. | Feb. 27, 1894 |
| 515,897 | Brack | Mar. 6, 1894 |
| 516,381 | Rudolph | Mar. 13, 1894 |
| 603,646 | Krekeler et al. | May 10, 1898 |
| 713,507 | Schraube et al. | Nov. 11, 1902 |
| 2,174,998 | Rossander et al. | Oct. 3, 1939 |